A. B. SHEAFFER.
Seats for Vehicles.
No. 148,329. Patented March 10, 1874.
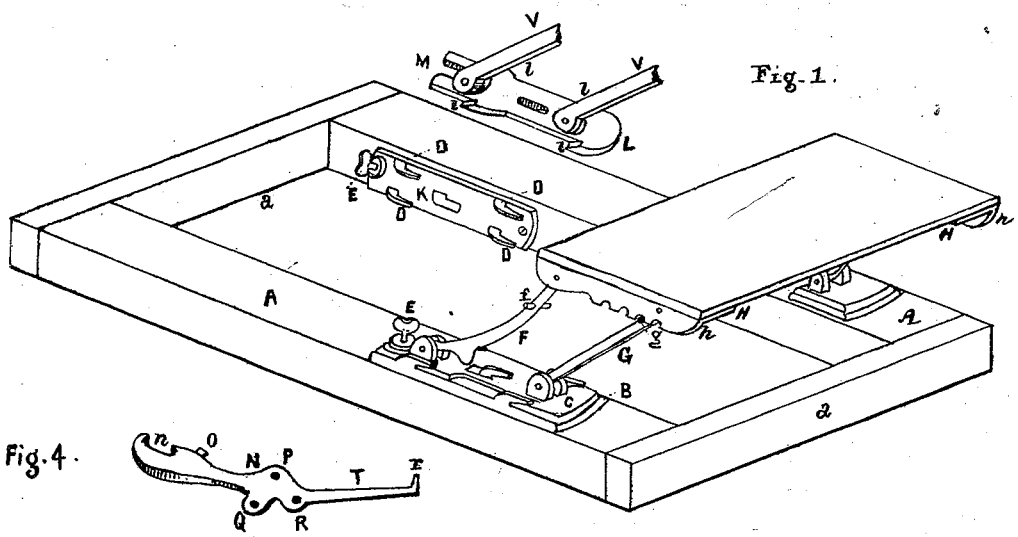
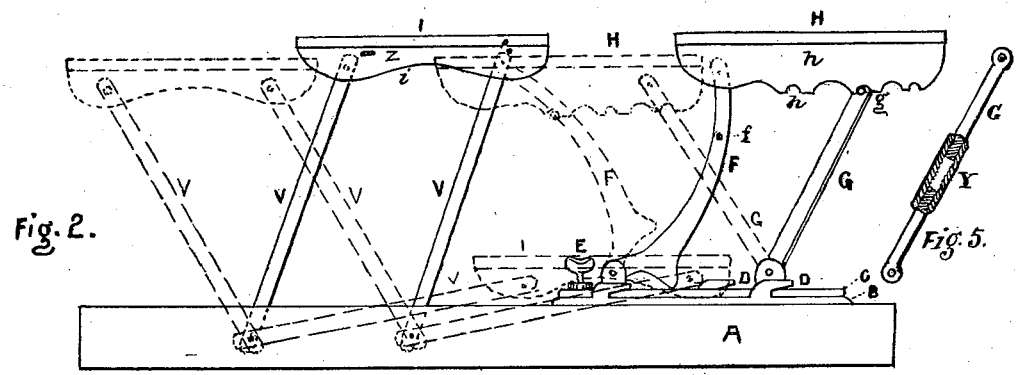
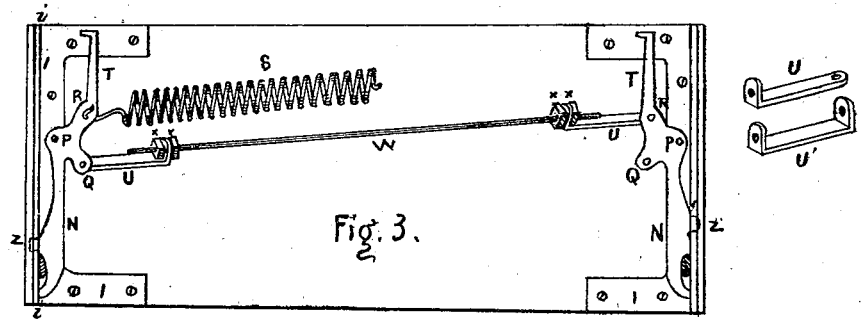
Witnesses. Inventor.

UNITED STATES PATENT OFFICE.

ALFRED B. SHEAFFER, OF NEW HOLLAND, PENNSYLVANIA.

IMPROVEMENT IN SEATS FOR VEHICLES.

Specification forming part of Letters Patent No. 148,329, dated March 10, 1874; application filed May 1, 1873.

*To all whom it may concern:*

Be it known that I, ALFRED B. SHEAFFER, of New Holland, in the county of Lancaster and State of Pennsylvania, have invented certain Improvements in Shifting Seats for Vehicles, of which the following is a specification:

The object of this invention is to produce a twofold adjustment of the hind seat, and a threefold adjustment of the front seat, adapted to being folded down, so that the hind seat can be turned over it, thus putting it out of the way. At the same time the foot-plates of the sill attachments are so made as to be readily detached and one or both seats removed—a provision highly desirable for various reasons herein specified.

The accompanying drawings show the construction and the adjustments, in which—

Figure 1 shows the sills and attached sill-plate of the front seat and the hind seat in place, in perspective; Fig. 2, a side elevation of the sill and both seats; the dotted lines show the several adjustments; Fig. 3, the under side of the front seat, one-fifth the full size, to show the levers and connecting-rod made adjustable by the jam-nuts $x$. Fig. 4 shows the construction of one of the clamp-levers and the seat, (shown in position by Fig. 3,) with its rod and spiral-spring adjustment. Fig. 5 shows a modification of the legs G for the hind seat, made in two parts, with screw ends for a sleeve, Y, with a screw-thread, by which the length of the leg can be adjusted to adapt it to sills raised up behind, as in some cases, and may be more convenient than to forge or cast them expressly to suit various curvature in order to set the sill-plate in the right position.

The legs of the seats are attached in pairs, on each side, to a foot-plate, L C, below, and above to the vertical sides $i\,h$ of the seat-plates I H, by means of pivot-bolts. The foot-plates have wedge-like side flanges, and a central slot with a wedge end, and are terminated in front by open wedge-formed slot M, to embrace a binding-screw, E, on the sill-plate, which, with the raised side and central lugs D on the same to receive the wedge-like slot and side flanges $l$ of the foot-plates, is made to slide in and under with ease, being readily secured, forming a firm attachment. The sill-plates K for the front seat are attached firmly to the inner vertical sides of the sills A, and those for the hind seat B on the top of the sills A. The foot-plates L, consequently, of the front seat are vertically attached, those of the hind seat horizontally, with reference to their edge, the latter differing only in having a pair of bearings on their upper face, between which the lower end of the legs F G are held on pivots and have their motion. The legs F have a kind of prop or foot below, which rests on the plate, or may be made to enter a slot, also. There is also a cross rest or pin, $f$, near the upper end. A similar rest, $g$, is also on the hind legs G. These rests $f$ and $g$ are so placed as to fit into rounded notches, the better for being partially embraced by said notches in the edge of the side plates $h$ of H, that support the seat in their several adjustments. (Shown in Fig. 2 by the dotted lines.) The adjustments of the front seat are made by means of open-slotted or jawed clamp-levers N, and appliances under the seat. (Shown by Fig. 3 on a scale the one-fifth actual size, or nearly.) The vertical flange $i$ of the seat-plates I has an open slot, Z. The legs are held by pivot-bolts on these flanges $i$. The upper end of the front legs rests against the raised curved edge of a beveled slot or jaw, $n$, in one end of the lever N, in which two adjustments of the seat can be made by the rest afforded against the front or back edge of the open slot $n$. This lever N has a fulcrum-pin, P, on the seat-plate I, and two arms, Q R T, perforated for attaching the spiral spring $s$, and adjusting-plates U, as shown, connected by the rod W, so as to act in unison. The spring is sufficiently strong to keep the head of the lever N firmly against the flange $i$, through which the lug or bolt $o$ on the lever also penetrates and locks it. The arms T of the levers are raised at the end, forming a handle, $r$, for moving them, or either of them.

In order to fold the front seat up, and lay it under the hind seat, it is only necessary, by means of the lever N, to open the jaw or draw out the bolt $o$, when it will allow the head or top of the legs V to pass through between the flange and lever without obstruction. The head of the lever, on the outer end, is rounded, so that by simply raising the seat the pressure of the upper portion of the legs pushes the lever-head out and receives the same into the slot n, the action of the spring s securing the same automatically.

I am aware that the adjusting-plates U for the single rod W are similar to those shown formerly made adjustable by the jam-nuts x. I also show a single adjusting-plate, U′, with both ends turned up, by the use of which two rods might be used by attaching one end to the levers, the other ends provided with a screw-thread and adjusted centrally. This I consider substantially the same.

It is often desirable to remove one seat altogether—in some cases the front, in others the hind seat; or, when carrying away passengers, both seats may be required. In returning, it may be desirable to throw the front seat down, and turn the hind seat over it, and bring it more forward. Sometimes the vehicle may be required without the obstruction of either seat, or for making internal repairs, painting, or cleaning the same, for all of which this is admirably adapted, and the utility is unquestionable, and the devices are considered novel. It is only necessary to slacken the binding-screws E, and then to withdraw the foot-plates from the sill-plates, and the entire seat is readily removed.

I am aware that shifting seats are not new; but I am not aware that any devices are substantially used and made in the manner shown and described. I am aware, also, that connecting-rods are employed, but not in the manner or arranged as herein set forth.

What I believe to be novel, and desire to secure by Letters Patent, is—

1. The arrangement of the sill-plates K B, with their raised wedge-lugs D and binding-screw E, in combination with the foot-plates L C, provided with wedge-shaped side flanges l and central slot, for the purpose of sliding on and securing them together, as described.

2. In combination with the sill and foot plates B C, the legs F and G, when provided with rests f and g for the reception of rounded notches in the edge of the flange h of the seat-plate H, for making the several adjustments of the same.

3. The clamping-lever N, with its open jaw or slot n, bolt o, and connecting parts P Q R, and stem T r, in combination with the adjusting-plates U, the connecting-rod W, and spiral spring s, all arranged to operate in the manner and for the purpose described.

ALFRED B. SHEAFFER.

Witnesses:
WM. B. WILEY,
JACOB STAUFFER.